(12) United States Patent
Jung et al.

(10) Patent No.: US 9,195,583 B2
(45) Date of Patent: Nov. 24, 2015

(54) METHODS OF MANAGING META DATA IN A MEMORY SYSTEM AND MEMORY SYSTEMS USING THE SAME

(75) Inventors: Dawoon Jung, Hwaseong-si (KR); Jeong-uk Kang, Bucheon-si (KR); Byunghei Jun, Seoul (KR)

(73) Assignee: Samsung Electronics Co., Ltd. (KR)

( * ) Notice: Subject to any disclaimer, the term of this patent is extended or adjusted under 35 U.S.C. 154(b) by 466 days.

(21) Appl. No.: 13/551,718

(22) Filed: Jul. 18, 2012

(65) Prior Publication Data

US 2013/0042054 A1 Feb. 14, 2013

(30) Foreign Application Priority Data

Aug. 9, 2011 (KR) .................. 10-2011-0079152

(51) Int. Cl.
*G06F 12/00* (2006.01)
*G06F 12/02* (2006.01)
(52) U.S. Cl.
CPC .... *G06F 12/0246* (2013.01); *G06F 2212/7201* (2013.01); *G06F 2212/7207* (2013.01)
(58) Field of Classification Search
CPC ............ G06F 12/0246; G06F 11/1471; G06F 11/1435
See application file for complete search history.

(56) References Cited

U.S. PATENT DOCUMENTS

| | | | |
|---|---|---|---|
| 8,793,429 B1* | 7/2014 | Call et al. ...................... 711/103 |
| 2005/0080762 A1* | 4/2005 | Nakashima et al. ............. 707/1 |
| 2009/0113112 A1* | 4/2009 | Ye et al. ......................... 711/102 |

FOREIGN PATENT DOCUMENTS

| | | |
|---|---|---|
| JP | 2010-152514 | 7/2010 |
| KR | 1020070096429 A | 10/2007 |
| KR | 1020090042035 A | 4/2009 |

* cited by examiner

*Primary Examiner* — Baboucarr Faal
(74) *Attorney, Agent, or Firm* — Myers Bigel Sibley & Sajovec, P.A.

(57) ABSTRACT

A method of managing meta data can be provided by generating log entry information including log data in response to changes to meta data that includes a plurality of groups of the meta data. A group of the meta data can be selected from among the plurality of groups of the meta data to provide a selected group of meta data in response to detecting that a number of pieces of the log entry information is equal to or greater than a particular threshold value. The selected group of the meta data and associated log data can be stored in a non-volatile memory device.

20 Claims, 14 Drawing Sheets

METHODS OF MANAGING META DATA IN A MEMORY SYSTEM AND MEMORY SYSTEMS USING THE SAME

CROSS-REFERENCE TO RELATED APPLICATIONS

This application claims the benefit of Korean Patent Application No. 10-2011-0079152, filed on Aug. 9, 2011, in the Korean Intellectual Property Office, the disclosure of which is incorporated herein in its entirety by reference.

BACKGROUND

One or more aspects of the inventive concept relate to a memory system and a meta data management method thereof.

Non-volatile memory devices are capable of retaining information stored therein even when a power off occurs. An example of a non-volatile memory device is flash memory. In general, a memory system can use meta data to manage a non-volatile memory device. Thus, there is a need to develop techniques for effectively managing meta data to enhance the performance of the memory system.

SUMMARY

Embodiments according to the inventive concept can provide methods of managing meta data. Pursuant to these embodiments, a method of managing meta data can be provided by generating log entry information including log data in response to changes to meta data that includes a plurality of groups of the meta data. A group of the meta data can be selected from among the plurality of groups of the meta data to provide a selected group of meta data in response to detecting that a number of pieces of the log entry information is equal to or greater than a particular threshold value. The selected group of the meta data and associated log data can be stored in a non-volatile memory device.

In some embodiments according to the inventive concept, the selected group of the meta data and the associated log data are stored together in one page of the non-volatile memory device. In some embodiments according to the inventive concept, the selected group of the meta data and the associated log data are stored at different pages of the non-volatile memory device.

In some embodiments according to the inventive concept, the method can further include storing information indicating an order in which the plurality of groups of the meta data and the log data are stored, in the non-volatile memory device.

In some embodiments according to the inventive concept, if the number of pieces of the log entry information is equal to or greater than the particular threshold value, the plurality of groups of the meta data are sequentially selected according to a round-robin scheme.

In some embodiments according to the inventive concept, if the number of pieces of the log entry information is equal to or greater than the initially set threshold value, groups of the meta data that are updated from among the plurality of groups of the meta data are sequentially selected according to a round-robin scheme.

In some embodiments according to the inventive concept, the method can further include deleting the log entry information that includes the associated log data from a memory buffer after the associated log data is stored in the non-volatile memory device.

In some embodiments according to the inventive concept, the method can further include restoring the meta data using the associated log data stored in the non-volatile memory device.

In some embodiments according to the inventive concept, restoring the meta data is performed after the memory system is powered on directly after an abnormal power off of the memory system. In some embodiments according to the inventive concept, the meta data is restored in units of the plurality of groups.

According to another aspect of the inventive concept, there is provided a memory system including a non-volatile memory device for storing data; a buffer memory for temporarily storing meta data divided into a plurality of groups, and log entry information that constitutes log data; and a memory controller for updating the meta data stored in the buffer memory when an operation causing a change in the meta data is performed on the non-volatile memory device, generating log entry information corresponding to the change in the meta data and storing the log entry information in the buffer memory, selecting one of the plurality of groups of the meta data stored in the buffer memory when a number of pieces of the log entry information stored in the buffer memory is equal to or greater than an initially set threshold value, and storing the log data and the selected group of the meta data in the non-volatile memory device.

In some embodiments according to the inventive concept, if an abnormal power off occurs and the memory system is powered on, then the memory controller may read the log data and the plurality of groups of the meta data in an order in which the log data and the plurality of groups of the meta data are stored in the non-volatile memory device, and restore the meta data by using the read log data.

In some embodiments according to the inventive concept, the memory controller may simultaneously perform the reading of the log data and the meta data from the non-volatile memory device and the restoring of the meta data by replaying the log data.

In some embodiments according to the inventive concept, a method of managing meta data for a non-volatile memory can be provided by transferring meta data and associated log data representing instructions used to generate the meta data from a buffer memory to a non-volatile memory upon detecting that the associated log data fills a particular amount of space in the buffer memory, wherein the particular amount is less than an entire amount of associated log data representing instructions used to generate an entirety of the meta data.

In some embodiments according to the inventive concept, the method can further include transferring additional meta data and additional associated log data representing instructions used to generate the additional meta data from the buffer memory to the non-volatile memory upon detecting that the additional associated log data fills a particular amount of additional space in the buffer memory.

In some embodiments according to the inventive concept, the meta data and associated log data in the buffer memory are deleted upon completion of transferring the meta data and associated log data to the non-volatile memory. In some embodiments according to the inventive concept, the method can further include detecting an abnormal power off of the non-volatile memory and then detecting a power on of the non-volatile memory. The meta data, the associated log data, the additional meta data and the additional associated log data can be read (in reverse sequence) from the non-volatile memory to provide read meta data and read associated log data. The entirety of the meta data can be restored using the read meta data and read associated log data.

In some embodiments according to the inventive concept, restoring the entirety of the meta data using the read meta data and read associated log data can be provided by re-playing the read associated log data.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EMBODIMENTS

Figure 1:
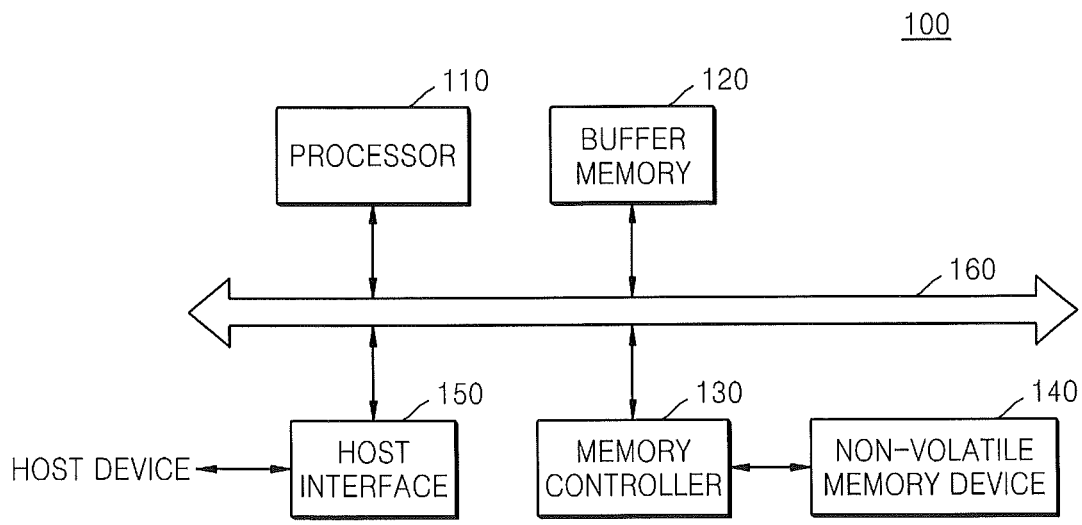
FIG. 1 is a block diagram of a memory system according to an embodiment of the inventive concept.

The inventive concept now will be described more fully hereinafter with reference to the accompanying drawings. The inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will further be appreciated by one of skill in the art, the present inventive concept may be embodied as methods, systems, and/or computer program products. Accordingly, the present inventive concept may take the form of an entirely hardware embodiment, an entirely software embodiment or an embodiment combining software and hardware aspects. Furthermore, the present inventive concept may take the form of a computer program product on a computer-usable storage medium having computer-usable program code embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM).

The inventive concept is also described using flowchart illustrations and block diagrams. It will be understood that each block (of the flowcharts and block diagrams), and combinations of blocks, can be implemented by computer program instructions. These program instructions may be provided to a processor circuit, such as a microprocessor, microcontroller or other processor, such that the instructions which execute on the processor(s) create means for implementing the functions specified in the block or blocks. The computer program instructions may be executed by the processor(s) to cause a series of operational steps to be performed by the processor(s) to produce a computer implemented process such that the instructions which execute on the processor(s) provide steps for implementing the functions specified in the block or blocks.

Accordingly, the blocks support combinations of means for performing the specified functions, combinations of steps for performing the specified functions and program instruction means for performing the specified functions. It will also be understood that each block, and combinations of blocks, can be implemented by special purpose hardware-based systems which perform the specified functions or steps, or combinations of special purpose hardware and computer instructions.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Computer program code or "code" for carrying out operations according to the present inventive concept may be written in an object oriented programming language such as JAVA®, Smalltalk or C++, JavaScript, Visual Basic, TSQL, Perl, or in various other programming languages. Software embodiments of the present inventive concept do not depend on implementation with a particular programming language.

It is understood that each block of the illustrations and combinations of blocks in the illustrations can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block and/or flowchart block or blocks.

These computer program instructions may be stored in a computer-readable memory that can direct a computer or other programmable data processing apparatus to function in a particular manner, such that the instructions stored in the computer-readable memory produce an article of manufacture including instruction means which implement the function specified in the block diagrams and/or flowchart block or blocks.

The computer program instructions may be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

FIG. 1 is a block diagram of a memory system 100 according to an embodiment of the inventive concept. Referring to FIG. 1, the memory system 100 includes a processor 110, a buffer memory 120, a memory controller 130, a non-volatile memory device 140, and a host interface 150.

The processor 110 controls overall operations of the memory system 100. Specifically, the processor 110 interprets a command received from a host device, and controls the memory system 100 to perform an operation based thereon.

The host interface 150 includes a data exchange protocol to exchange data with the host device that accesses the memory system 100, and connects the memory system 100 and the host device to each other. The host interface 150 may be a serial advanced technology attachment (operation SATA) interface, a parallel advanced technology attachment (PATA) interface, a universal serial bus (USB), or a serial attached small computer system (operation SAS) interface, but is not limited thereto.

The memory controller 130 is electrically connected to the non-volatile memory device 140. The memory controller 130 exchanges, for example, commands, addresses, and/or data, with the non-volatile memory device 140. In other words, the memory controller 130 can provide a read command and an address to the non-volatile memory device 140 during a read operation, and can provide a write command, an address, and data to the non-volatile memory device 140 during a write operation. The memory controller 130 may translate a logical address received from the host device to a physical address by using meta data stored in the buffer memory 120.

Here, the meta data means either user data or data generated by the memory system 100 to manage the non-volatile memory device 140. The meta data may include mapping information for translating a logical address to a physical address of the non-volatile memory device 140, and other information for managing a memory space of the non-volatile memory device 140.

When power is supplied to the memory system 100, the memory controller 130 sequentially reads meta data that is divided into a plurality of groups (pieces) from the non-volatile memory device 140, and generates commands and addresses to be stored in the buffer memory 120. When the non-volatile memory device 140 performs an operation causing a change in the meta data, the memory controller 130 controls the memory system 100 to update the meta data stored in the buffer memory 120, generate log entry information corresponding to the change in the meta data, and store the log entry information in the buffer memory 120. The log entry information includes information for restoring the change in the meta data. For example, the log entry information may include a type of information representing the type of the operation causing the change in the meta data, and substantial data for restoring the change in the meta data. The type of information may include a plurality of pieces of information defining the types of all possible operations, e.g., a write operation, block allocation, and copying pages, which may cause a change in the meta data. The substantial data includes a logical address, a previous physical address, a new physical address, and the like. Log data consists of a plurality of pieces of log entry information.

Figure 2:
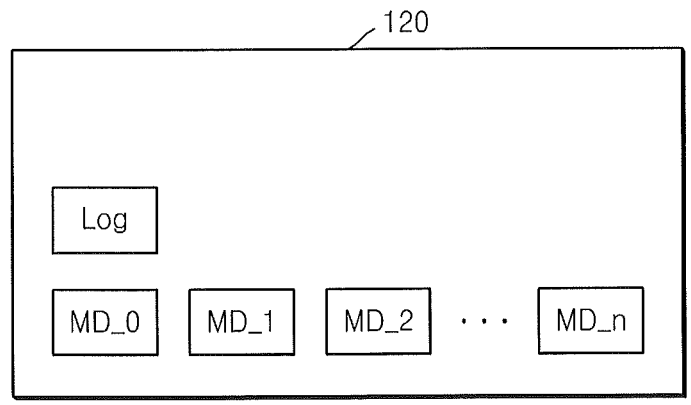
FIG. 2 illustrates examples of information stored in a buffer memory of FIG. 1, according to an embodiment of the present inventive concept.

Whenever the number of pieces of log entry information stored in the buffer memory 120 is equal to or greater than an initially set threshold value, the memory controller 130 controls the memory system 100 to store log data, and a group of the meta data is selected from among a plurality of groups of the meta data stored in the buffer memory 120 in the non-volatile memory device 140. For example, if all of log entry regions allocated to the buffer memory 120 are filled with log entry information, then each group of the meta data may be sequentially selected from among the plurality of groups of the meta data stored in the buffer memory 120 according to a round-robin scheme and is then stored together with the log data in the non-volatile memory device 140. For example, when the meta data is divided and stored into (n+1) groups MD_0 to MD_n as illustrated in FIG. 2, each of the (n+1) groups MD_0 to MD may be sequentially selected according to a round-robin scheme and then be stored with the log data in the non-volatile memory device 140. After the log data is stored in the non-volatile memory device 140, the memory controller 130 deletes the log entry information from the buffer memory 120. Thus, the log entry regions allocated to the buffer memory 120 become empty.

When an abnormal power off occurs and the memory system 100 is later powered on, the memory controller 130 controls the memory system 100 to restore the meta data by reading valid log data and valid meta data from the non-volatile memory device 140 in units of the groups of the meta data in the order in which the log data and the meta data are stored in the non-volatile memory device 140. Here, the abnormal power off means that power supplied to the memory system 100 is cut off even though a power off command is not input to the memory system 100.

A meta data management method performed under control of the memory controller 130 according to an embodiment of the inventive concept is described in detail with reference to FIGS. 8 to 13 below.

In some embodiments according to the inventive concept, the memory controller 130 and the buffer memory 120 may be integrated in one chip, and the processor 110 and the memory controller 130 may be integrated in one chip. In some embodiments according to the inventive concept, the processor 110, the buffer memory 120, the memory controller 130, the non-volatile memory device 140, and the host interface 150 may be integrated in one chip.

The buffer memory 120 temporarily stores data received from the host device and data generated by the memory controller 130 or temporarily stores data to be transmitted to the host device. The buffer memory 120 is allocates a region for storing meta data and log data. The buffer memory 120 may be embodied as, for example, dynamic random access memory (DRAM) or static random access memory (SRAM).

FIG. 2 illustrates examples of information stored in the buffer memory 120 of FIG. 1, according to an embodiment of the present inventive concept. Referring to FIG. 2, meta data is divided and stored as a plurality of groups in the buffer memory 120. Log data stored in the buffer memory 120 may include a limited number of log entries. For example, the meta data may be divided into physical page storage units of the non-volatile memory device 140. Alternatively, a page may be divided into arbitrarily determined sizes and log data, and a part of the meta data may be stored therein. Also, sizes into which the meta data is to be divided and the number of log entries that constitute the log data may be determined so that a group of the meta data and the log data may be stored in one physical page of the non-volatile memory device 140. The meta data may be divided into a plurality of groups according to a logical address. Referring to FIG. 2, the meta data is divided into (n+1) pieces.

Figure 7:
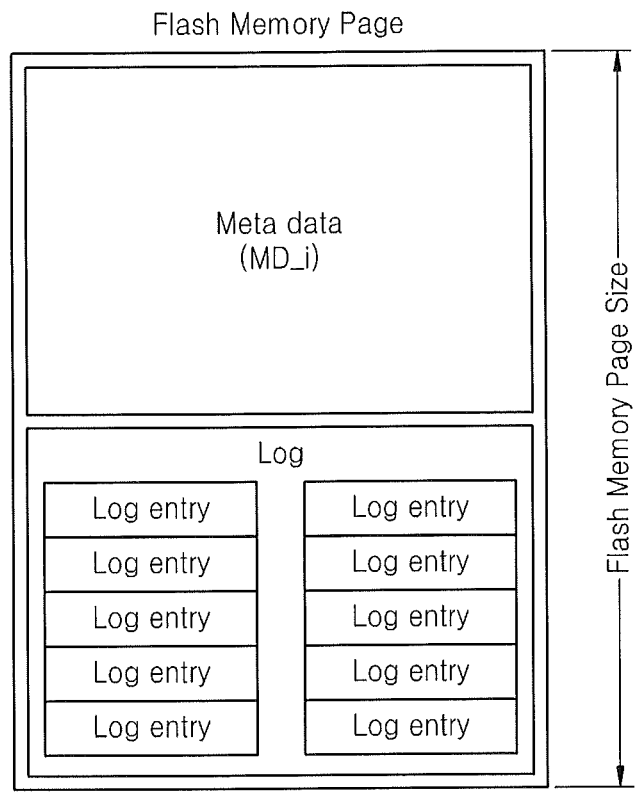
FIG. 7 is a diagram illustrating a process of storing meta data and log data in a non-volatile memory device, according to an embodiment of the inventive concept.

FIG. 7 illustrates that when the non-volatile memory device 140 is embodied as flash memory, a group of meta data MD_i and log data can be stored in one physical page of the flash memory.

The non-volatile memory device 140 may be embodied as a non-volatile semiconductor memory device. Specifically, the non-volatile memory device 140 may be flash memory, phase change RAM (PRAM), ferroelectric RAM (FRAM), magnetic RAM (MRAM), or the like.

Figure 3:
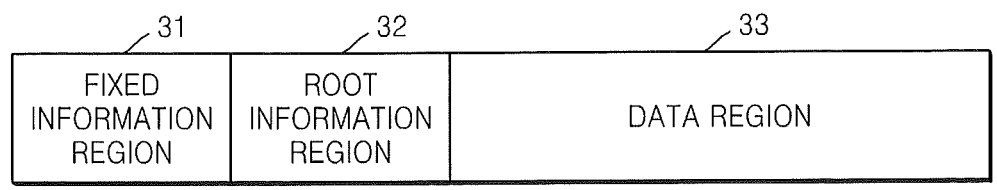
FIG. 3 illustrates a structure of an information storage region of a non-volatile memory device of FIG. 1.

Referring to FIG. 3, a storage region of the non-volatile memory device 140 may be divided into a fixed information region 31, a root information region 32, and a data region 33.

In the fixed information region 31, unique information regarding the non-volatile memory device 140, e.g., information regarding a file system, version information, and the number of pages for each block, may be stored.

The root information region 32 can indicate an order in which pieces (groups) of the meta data are stored, and the locations where the meta data is stored. If sizes into which the meta data is to be divided and the number of log entries that constitute log data are determined so that each group of the meta data and the log data may be stored in the same physical page of the non-volatile memory device 140, then the information regarding the location of the log data does not need to be stored in the root information region 32. However, when the pieces (groups) of the meta data and the log data are stored at different pages, both information regarding the location of each group of the meta data and information regarding the location of the log data are stored in the root information region 32. Also, information regarding time when the log data and the meta data are respectively stored (e.g., time stamps), or information regarding the order in which the log data and the meta data are stored, may be stored in the root information region 32. Also, flag information indicating whether a normal power off occurs may be stored in the root information region 32.

In the data region 33, the meta data, the log data, and user data are stored. The meta data may be divided into physical page storage units of the non-volatile memory device 140 (flash memory). Also, sizes into which the meta data is to be divided and the number of log entries that constitute the log data may be determined so that each group of the meta data and the log data may be stored in the same physical page of the non-volatile memory device 140. The meta data may be divided into a plurality of groups according to a logical address. The data region 33 may be divided into a meta data storage region and a user data region.

Figure 4:
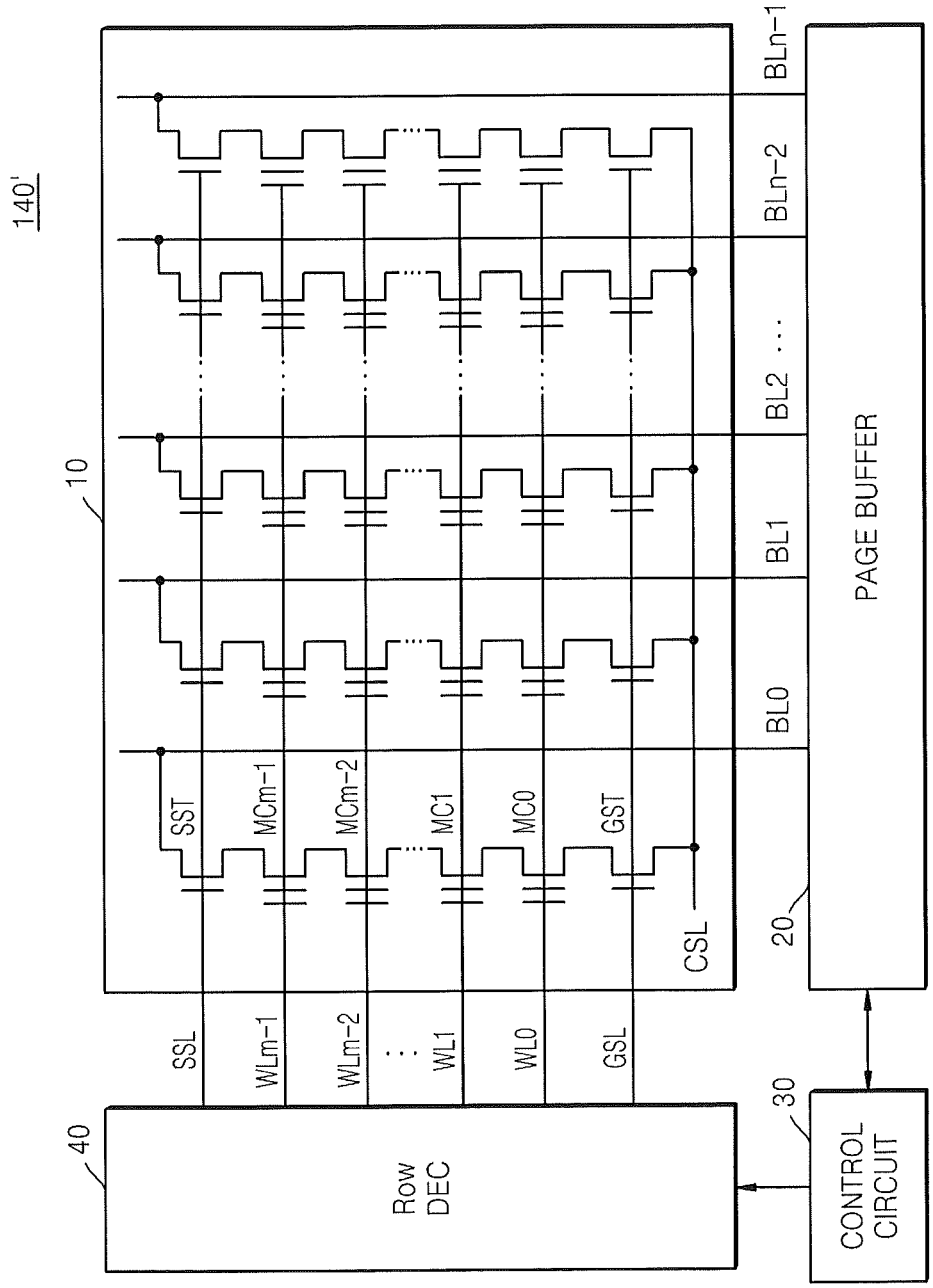
FIG. 4 is a block diagram of a non-volatile memory device, such as that illustrated in FIG. 1, according to an embodiment of the inventive concept.

A structure of the non-volatile memory device 140 that is a flash memory, according to an embodiment of the inventive concept is specifically illustrated in FIG. 4.

Referring to FIG. 4, a flash memory 140' includes a cell array 10, a page buffer 20, a control circuit 30, and a row decoder 40.

In the cell array 10, data is written by applying a voltage to a transistor. The cell array 10 includes memory cells formed at intersections of word lines WL0 to WLm−1 and bit lines BL0 to BLn−1. Here, 'm' and 'n' are natural numbers. Although FIG. 4 illustrates one memory block, the cell array 10 may include a plurality of memory blocks. Each of the memory blocks includes pages corresponding to the word lines WL0 to WLm−1. Each of the pages includes a plurality of memory cells that are respectively connected to the word lines WL0 to WLm−1. The flash memory 140' performs an erase operation in units of blocks, and performs a program operation or a read operation in units of pages.

The memory cell array 10 has a cell string structure. Each of cell strings in the cell string structure includes a string selection transistor SST connected to a string selection line SSL, a plurality of memory cells MC0 to MCm−1 being respectively connected to the word lines WL0 to WLm−1, and a ground selection transistor GST connected to a ground selection line (GSL). The string selection transistor SST is connected between a corresponding bit line and a string channel, and the string selection transistor SST is connected to the string channel and a common source line (CSL).

The page buffer 20 is connected to the cell array 10 via the bit lines BL0 to BLn−1. The page buffer 20 temporarily stores data to be written to or data read from memory cells connected to a word line selected from among the word lines WL0 to WLm−1.

The control circuit 30 generates various voltages for performing a write/read operation or an erase operation, and controls overall operations of the flash memory 140' by receiving control signals.

The row decoder 40 is connected to the cell array 10 via the string selection line SSL, the ground selection line GSL, and the word lines WL0 to WLm−1. In the write/read operation, the row decoder 40 receives an address and selects one of the word lines WL0 to WLm−1 according to the received address. The selected word line is connected to memory cells on which the write operation or read operation is to be performed.

The row decoder 40 applies voltages, e.g., a program voltage, a pass voltage, a read voltage, a string selection voltage, and a ground selection voltage, which are needed to perform the program operation or the read operation, to the selected word line, the other non-selected word lines, the string selection line SSL, and the ground selection line GSL.

Each of the memory cells may store a single or multiple bits of data. A memory cell that stores 1-bit data is referred to as a 'single-level cell (SLC)', and a memory cell that stores 2 or more-bit data is referred to as a 'multi-level cell (MLC)'. The SLC has an erase state or a program state according to a threshold voltage.

In the flash memory 140', writing and reading are performed in units of pages, and electrical erasing is performed in units of blocks. A block should be electrically erased before writing is performed thereon. Thus, overwriting is not possible.

In a memory device that cannot be overwritten, user data cannot be written to a desired physical region. Thus, if a request for accessing the memory device to perform the write/read operation thereon is received from a user, then address translation may be performed to translate a logical address of user data into a physical address by classifying a region on which the user wants to perform the write/read operation and a region in which data is substantially stored or is to be stored by using a logical address and a physical address, respectively.

A process of translating an address in the memory system 100 by using meta data, according to an embodiment of the inventive concept is described with reference to FIGS. 5 and 6 below.

Figure 5:
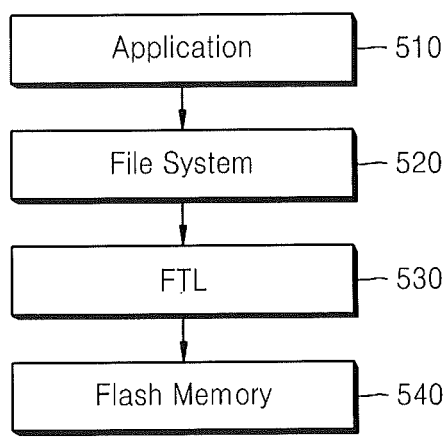
FIG. 5 illustrates a software structure of a memory system, according to an embodiment of the inventive concept.

FIG. 5 illustrates a software structure of the memory system 100 of FIG. 1, according to an embodiment of the inventive concept. Specifically, FIG. 5 illustrates a software structure of the memory system 100 when the non-volatile memory device 140 is flash memory.

Referring to FIG. 5, the memory system 100 has a software hierarchical structure in which an application 510, a file system 520, a flash translation layer (FTL) 530, and a flash memory 540 are hierarchically organized and operate in sequence, as shown.

The application 510 includes program instructions that, when executed, can process user data in response to a request from a user. For example, the application 510 may be document processing software, e.g. a word processor, calculation software, or a document viewer, e.g., a web browser. The application 510 processes user data according to an input from the user and provides a command to a file system 520 that instructs the processed user data be stored in the flash memory 540. The application 510 may be included in a host device outside the memory system 100.

The file system 520 means a scheme or software for storing the user data in the flash memory 540. The file system 520 allocates a logical address where the user data is to be stored, in response to a command given from the application 510. Examples of the file system 520 are a File Allocation Table (FAT) file system and a new technology file system (NTFS).

The FTL 530 translates the logical address received from the file system 520 into a physical address for performing a read/write operation on the flash memory 540. The FTL 530 may have a structure as illustrated in FIG. 6.

Figure 6:
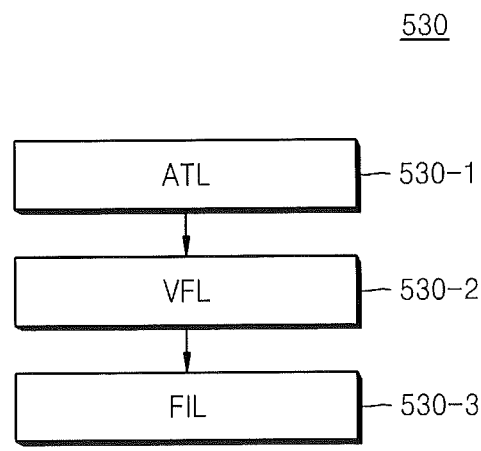
FIG. 6 is a block diagram of a flash translation layer (FTL) of FIG. 5, according to an embodiment of the inventive concept.

Referring to FIG. 6, the FTL 530 includes an address translation layer (ATL) 530-1, a virtual flash layer (VFL) 530-2, and a flash interface layer (FIL) 530-3.

The ATL 530-1 translates a logical address, e.g., a logical block address (LBA), which is received from the file system 520, into a logical page address. The ATL 530-1 may perform address translation by using mapping information in which a logical address transmitted from a host device is mapped to a logical page address of the flash memory 540. The mapping information is included in meta data, and the meta data is stored in the flash memory 540. Information regarding the location where the meta data is stored is stored in the root information region 32 of FIG. 3. Thus, when the memory system 100 is initialized, the location where the meta data is stored may be detected by reading data stored in the root information region 32. Referring to FIG. 1, the meta data read from the flash memory 540 when the memory system 100 is initialized may be stored in the buffer memory 120, and the memory controller 130 may translate a logical address into a logical page address by using the meta data stored in the buffer memory 120.

Address mapping may be performed using a page mapping method or a block mapping method. Specifically, address mapping is performed in units of pages according to the page mapping method, and is performed in units of blocks according to the block mapping method. Otherwise, a mixed mapping method that is a combination of the page mapping method and the block mapping method may be used.

The meta data includes the mapping information for translating a logical address, e.g., an LBA, into a physical address of the flash memory 540, e.g., a block address or a page address. The meta data may further include information indicating an erase state of each block or validity of each page, and information indicating the number of times that writing may be performed on each page.

The VFL 530-2 translates the logical page address into a virtual page address by using the mapping information included in the meta data. Here, the virtual page address may correspond to the physical address of the flash memory 540. The virtual page address may correspond to a physical block of the flash memory 540, but not to bad blocks. The meta data includes the mapping information for translating a logical page address into a virtual page address.

The FIL 530-3 translates a virtual page address of the VFL 530-2 into a physical page address of the flash memory 540. The meta data includes mapping information for translating a virtual page address into a physical page address.

The FIL 530-3 may include a low-level driver that controls hardware of the flash memory 540, and a module that performs error correction coding to correct an error in data read from the flash memory 540 and performs error block management.

Referring back to FIG. 1, program instructions may be provided to the processor 110 to perform some of the processes performed by the memory controller 130. The processor 110 or the memory controller 130 may be integrated in a processor or a controller so as to control the memory system 100.

A meta data management method according to an embodiment of the inventive concept will now be described with reference to FIG. 8.

Figure 8:
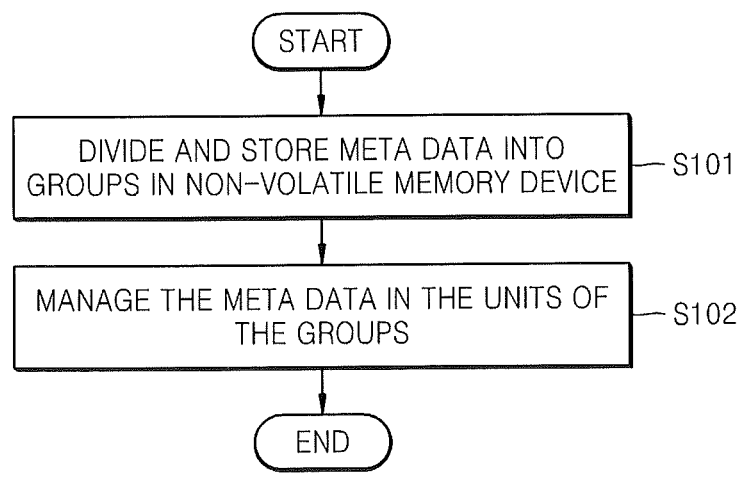
FIG. 8 is a flowchart illustrating a meta data management method according to an embodiment of the inventive concept.

The meta data management method of FIG. 8 may be performed by the memory controller 130 of the memory system 100 illustrated in FIG. 1. For convenience of explanation, it is assumed that the non-volatile memory device 140 is flash memory. The non-volatile memory device 140 of memory system 100 is not limited to flash memory and may be embodied as PRAM, FRAM, MRAM, or the like.

Referring to FIG. 8, meta data is divided and stored into a plurality groups in the non-volatile memory device 140 (operation S101). The meta data may include mapping information used to translate a logical address into a physical address of the non-volatile memory device 140, e.g., a flash memory, and may include information for managing a storage space of the non-volatile memory device 140. For example, the meta data may be divided into physical page storage units of the flash memory. Sizes into which the meta data is to be divided and the number of log entries that constitute log data may be determined so that each group of meta data and the log data may be stored in the same physical page of the non-volatile memory device 140, as illustrated in FIG. 7. For example, the meta data may be divided into a plurality of groups according to a logical address. The meta data may be divided into a plurality of groups and the plurality of groups may be respectively stored at different physical addresses of the non-volatile memory device 140. Thus, referring to FIG. 3, physical addresses at which the plurality of groups are respectively stored, are stored in the root information region 32 of the non-volatile memory device 140. For example, if the meta data is divided into a plurality of groups in units of pages, the addresses of blocks of the non-volatile memory device 140, in which the plurality of groups are respectively stored, and page addresses are stored in the root information region 32.

Next, the memory system 100 manages the meta data in units of the plurality of groups (operation S102). Specifically, updated meta data and log data may be stored in the non-volatile memory device 140 and the meta data may be restored using the stored log data, as described below.

A method of storing meta data according to an embodiment of the inventive concept can be provided by dividing meta data into predetermined-sized groups of the meta data MD_i. Here, i=0, 1, 2, . . . , n, and '(n+1)' denotes a number by which the meta data is divided. In other words, '(n+1)' denotes the number of groups into which the meta data is divided. A group of the meta data MD_i corresponds to a piece of the meta data.

Updated meta data is directly stored in the buffer memory 120, and log data obtained from the original meta data is stored separately from the updated meta data. When the log data completely fills the allocated space, the log data and some of the plurality of groups are selected and written to the non-volatile memory device 140.

It is assumed that an $i^{th}$ piece of the meta data written to the non-volatile memory device 140 at a point of time $T_j$ is in a group of meta data MD_i($T_j$), and that log data written at the point of time $T_j$ is log data Log($T_j$).

In this case, the group of meta data MD_i($T_j$) reflects all of log data Log($T_k$), wherein k≤j. The group of meta data MD_i(T) may be restored by replaying the log data Log($T_k$), wherein j<k. It will be understood that the term "replayed" can include actions where previously executed instructions (recorded by the log data) can be re-executed so that if an initial meta data state is provided to the instructions stored in the log, the most up-to-date meta data can be restored.

If the group of meta data MD_i($T_j$) is written to the non-volatile memory device 140, then a group of meta data MD_i($T_k$) is invalid, wherein j<k.

Based on the above description, the groups of meta data MD_i are sequentially selected and stored according to a round-robin scheme. In this case, the log data Log($T_j$) becomes invalid after a point of time $T_{j2}$ at which a group of meta data MD_i2 is selected and written, starting from a point of time $T_{j1}$ at which a group of meta data MD_i1 is selected and written, wherein j<j1. Also, the group of meta data MD_i ($T_j$) is written between points of time $T_{j1}$ and $T_{j2}$, and the group of meta data MD_i($T_k$) becomes invalid.

A method of restoring meta data according to an embodiment of the inventive concept can be provided by reading pieces of meta data in the order in which they were written to the non-volatile memory device 140 (flash memory). In this case, only valid pieces of the meta data are read. If log data written to the non-volatile memory device 140 at the point of time when the pieces of the meta data are read is valid, then the log data is also read.

After reading of the log data, pieces of the meta data written before the log data was written are restored using the log data. If restoration information remaining in the log data is a piece of meta data that has yet to be read, then the piece of the meta data is not restored.

This process is repeatedly performed until a piece of the meta data and log data that were lastly written are read.

For example, it is assumed that a piece of meta data MD_i0 ($T_{j0}$) is first read from the non-volatile memory device 140, all log data written before a point of time $T_{j1}$ is invalid, and log data and pieces of the meta data are written until a point of time $T_{j2}$.

Then, a piece of meta data MD_i($T_j$) written at a point of time satisfying j0≤j≤j1 is read without reading log data. Also, a piece of meta data MD_i($T_j$) and log data Log($T_j$) that satisfy j1≤j≤j2 are read together, and a piece of meta data MD_i($T_K$)(k<j) is restored using the log data Log($T_j$).

Restoring of a piece of the meta data by replaying-log data may overlap with reading of a piece of meta data and log data.

Next, a method of storing meta data log data in a non-volatile memory device, e.g., flash memory, according to an embodiment of the inventive concept will be described below with reference to the flowchart of FIG. 9.

A meta data restoring method performed when the memory system 100 of FIG. 1 is powered on and a power off does not occur, according to an embodiment of the inventive concept will now be described with reference to FIG. 9.

First, the memory controller 130 reads meta data, which is divided into pieces (groups), from the non-volatile memory device 140 (flash memory) and stores the pieces of the meta data in the buffer memory 120 (operation S201). In other words, when the memory system 100 is powered on, the memory controller 130 reads the pieces (groups) of the meta data from the non-volatile memory device 140 and then stores the groups of the meta data in the buffer memory 120. For example, the meta data may be divided and stored into four groups (pieces) of the meta data MD_0, MD_1, MD_2, and MD_3 in the buffer memory 120.

If flag information indicating that a normal power off occurs is stored in the root information region 32 of non-volatile memory device 140, then restoring of the meta data is not needed. A case where flag information indicating that an abnormal power off occurs is stored in the root information region 32, will be described in detail below with reference to FIGS. 11 to 13.

Next, when the memory system 100 performs a change on the meta data, the meta data stored in the buffer memory 120 is updated, and log entry information corresponding to the change in the meta data is generated and stored in the buffer memory 120 (operation S202). In other words, if an operation causing a change in the meta data, e.g., writing data to the non-volatile memory device 140, is performed, the memory controller 130 determines which group of the meta data is to be changed in the buffer memory 120 and updates the determined group of the meta data. In this case, the memory controller 130 also generates log entry information and stores the log entry information in the buffer memory 120. The log entry information may include type information representing the type of the operation causing the change in the meta data, and substantial data for restoring the meta data.

Next, the memory controller 130 determines whether the number of pieces of generated log entry information is equal to or greater than an initially set threshold value $V_{th}$ (operation S203). For example, whether the number of the pieces of generated log entry information is equal to or greater than the initially set threshold value $V_{th}$ may be determined by checking whether a log entry region allocated to the buffer memory 120 is completely filled with the log entry information.

If it is determined in operation 203 that the number of pieces of log entry information is less than the initially set threshold value $V_{th}$, the method returns back to operation 202.

If it is determined in operation 203 that the number of pieces of log entry information is equal to or greater than the initially set threshold value $V_{th}$, the memory controller 130 selects one of the groups of meta data stored in the buffer memory 120 (operation S204). For example, the groups of the meta data may be sequentially selected according to a round-robin scheme. As another example, only groups of the meta data that are updated may be sequentially selected according to the round-robin scheme.

Next, the group of the meta data selected in operation S204 and associated log data are read from the buffer memory 120 and are stored in the non-volatile memory device 140 (operation S205).

Root information related to the group of the meta data stored in operation 205 is stored in the non-volatile memory device 140, and the log entry information is deleted from the buffer memory 120 (operation S206). The root information may include information regarding the physical location where the meta data and log data are stored, and information indicating the order in which the groups of the meta data are stored.

It is determined whether a power off occurs in the memory system 100 (operation S207). If it is determined in operation S207 that a power off occurs in the memory system 100, the method ends. If it is determined in operation S207 that a power off does not occur, the method returns back to operation 202. If a normal power off occurs, all groups of the meta data updated in the buffer memory 120 may be stored in the non-volatile memory device 140 and then power supplied to the memory system 100 may be cut off.

Figure 9:
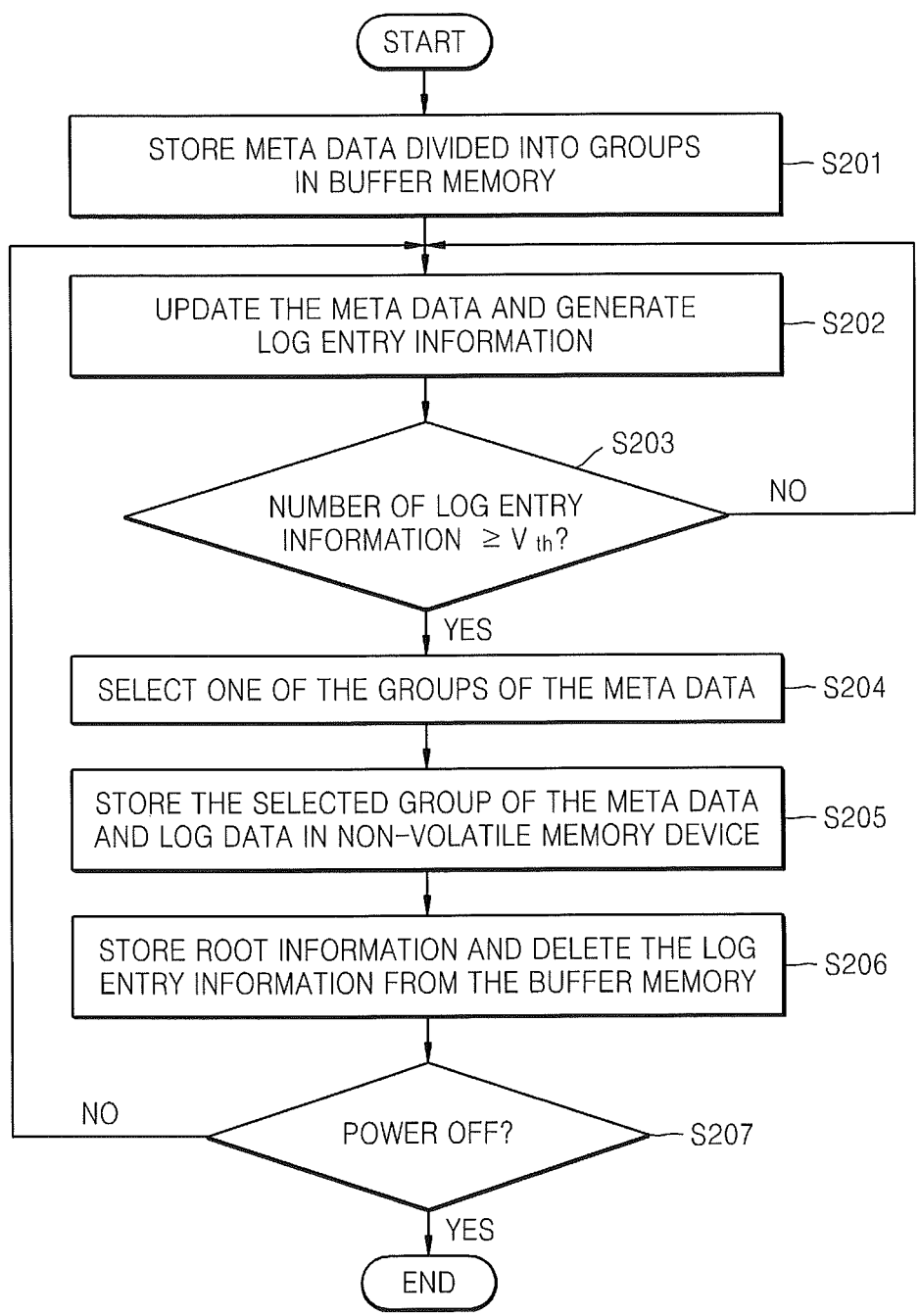
FIG. 9 is a flowchart illustrating a method of sequentially storing meta data, which is divided into pieces, and log data in a non-volatile memory device, according to an embodiment of the inventive concept.
Figure 14:
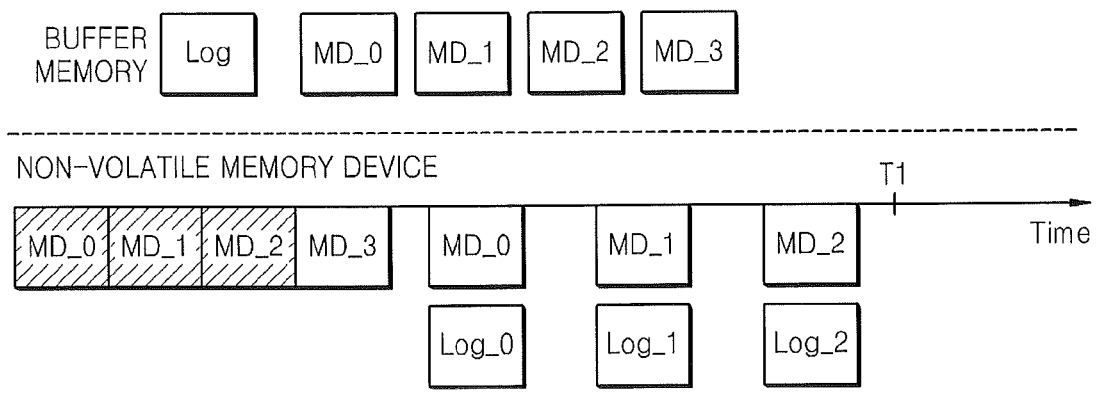
FIG. 14 is a diagram illustrating a state in which meta data that is divided into pieces (groups), and log data are sequentially stored in a non-volatile memory device, according to an embodiment of the inventive concept.
Figure 15:
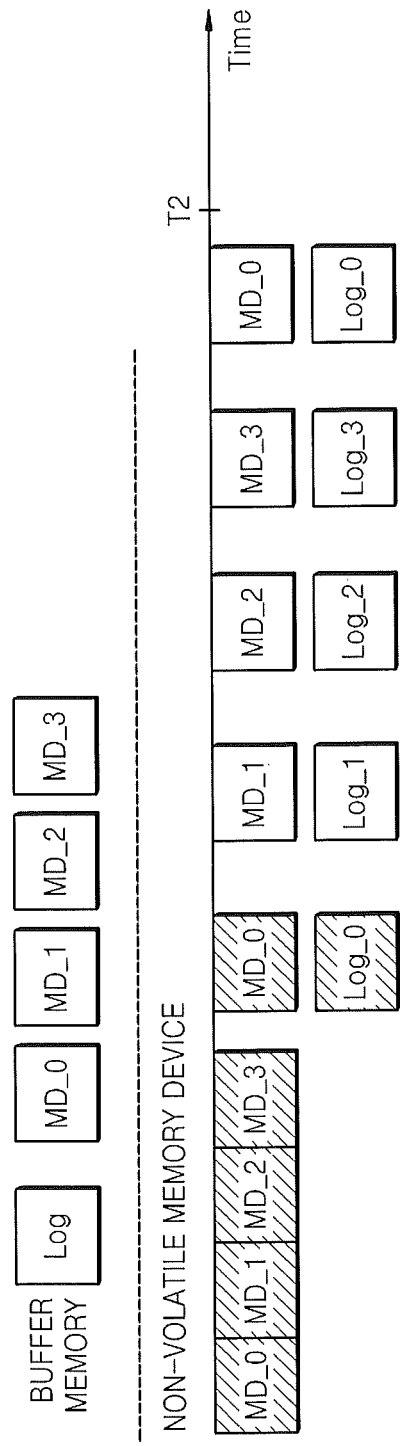
FIG. 15 is a diagram illustrating a state in which meta data that is divided into pieces (groups), and log data are sequentially stored in a non-volatile memory device, according to another embodiment of the inventive concept.
Figure 16:
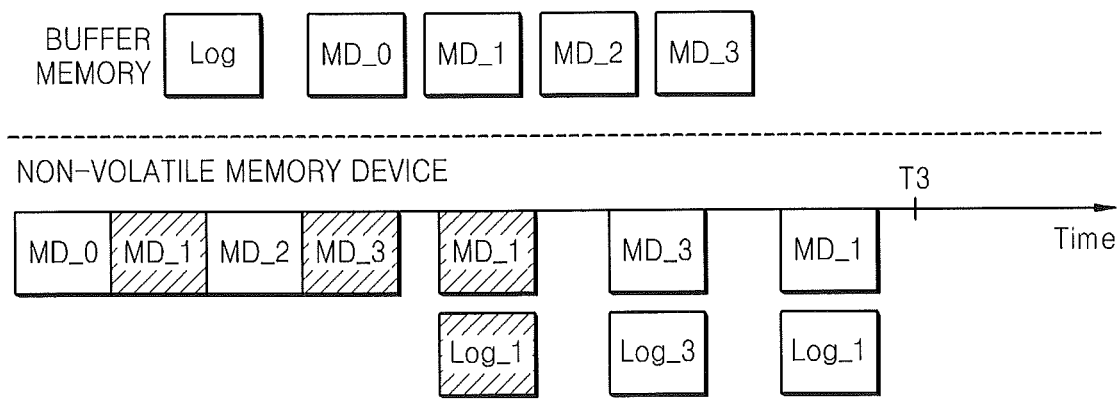
FIG. 16 is a diagram illustrating a state in which meta data that is divided into pieces (groups), and log data are sequentially stored in a non-volatile memory device, according to another embodiment of the inventive concept.

Examples of log data and meta data that are stored in a flash memory according to the method of FIG. 9 are illustrated in FIGS. 14 to 16.

For example, FIGS. 14 and 15 illustrate cases where four groups of meta data MD_0 to MD_3 are sequentially selected according to the round-robin scheme and are then stored together with log data in a non-volatile memory device (flash memory). In the figures, pieces of invalid meta data are shown as shaded.

As another example, FIG. 16 illustrates a case where only groups of updated meta data are sequentially selected according to the round-robin scheme, and a group of the meta data selected from among the groups of the updated meta data and log data are stored together in a non-volatile memory device (flash memory).

Referring to FIG. 14, if log data at a first point of time when a log entry region is completely filled with log entry information is log data Log_0, and a $0^{th}$ group of meta data MD_0 is selected, then the piece of meta data MD_0 and the log data Log_0 are simultaneously stored in the non-volatile memory device at the first point of time. When the piece of meta data MD_0 is stored in the non-volatile memory device at the first point of time, a piece of meta data MD_0 being previously stored in the non-volatile memory device becomes invalid. Although in some embodiments according to the inventive concept operations are described as being done "simultaneously" in other embodiments the operations may be carried out at different times.

If log data at a second point of time when the log entry region is completely filled with log entry information is log data Log_1, and a first group of meta data MD_1 is selected, then the piece of meta data MD_1 and the log data Log_1 are simultaneously stored in the non-volatile memory device at the second point of time. When the piece of meta data MD_1 is stored in the non-volatile memory device at the second point of time, a piece of meta data MD_1 being previously stored in the non-volatile memory device becomes invalid.

If log data at a third point of time when the log entry region is completely filled with log entry information is log data Log_2, and a second group of meta data MD_2 is selected, then the piece of meta data MD_2 and the log data Log_2 are simultaneously stored in the non-volatile memory device at the third point of time. When the piece of meta data MD_2 is stored in the non-volatile memory device at the third point of time, a piece of meta data MD_2 being previously stored in the non-volatile memory device becomes invalid.

Referring to FIG. 15, if log data at a first point of time when a log entry region is completely filled with log entry information is log data Log_0, and a $0^{th}$ group of meta data MD_0 is selected, then the piece of meta data MD_0 and the log data Log_0 are simultaneously stored in a non-volatile memory device at the first point of time. When the piece of meta data MD_0 is stored in the non-volatile memory device at the first point of time, a piece of meta data MD_0 being previously stored in the non-volatile memory device becomes invalid. In FIG. 15, pieces of invalid meta data are shaded.

If log data at a second point of time when the log entry region is completely filled with log entry information is log data Log_1, and a first group of meta data MD_1 is selected, then the piece of meta data MD_1 and the log data Log_1 are simultaneously stored in the non-volatile memory device at the second point of time. When the piece of meta data MD_1 is stored in the non-volatile memory device at the second point of time, a piece of meta data MD_1 being previously stored in the non-volatile memory device becomes invalid.

If log data at a third point of time when the log entry region is completely filled with log entry information is log data Log_2, and a second group of meta data MD_2 is selected, then the piece of meta data MD_2 and the log data Log_2 are simultaneously stored in the non-volatile memory device at the third point of time. When the piece of meta data MD_2 is stored in the non-volatile memory device at the third point of time, a piece of meta data MD_2 being previously stored in the non-volatile memory device becomes invalid.

If log data at a fourth point of time when the log entry region is completely filled with log entry information is log data Log_3, and a third group of meta data MD_3 is selected, then the piece of meta data MD_3 and the log data Log_3 are simultaneously stored in the non-volatile memory device at the fourth point of time. When the piece of meta data MD_3 is stored in the non-volatile memory device at the fourth point of time, a piece of meta data MD_3 being previously stored in the non-volatile memory device becomes invalid.

If log data at a fifth point of time when the log entry region is completely filled with log entry information is the log data Log_0, and the $0^{th}$ group of meta data MD_0 is selected for the second time, then the piece of meta data MD_0 and the log data Log_0 are simultaneously stored in the non-volatile memory device at the fifth point of time. When the piece of meta data MD_0 and the log data Log_0 are stored in the non-volatile memory device at the fifth point of time, the piece of meta data MD_0 and the log data Log_0 being previously stored in the non-volatile memory device become invalid.

Referring to FIG. 16, if groups of meta data updated at a point of time when a log entry region is completely filled with log entry information are groups of meta data MD_1 and MD_3, then the groups of meta data MD_1 and MD_3 are selected according to the round-robin scheme whenever the log entry region is completely filled with log entry information, and are then sequentially stored in a non-volatile memory device (flash memory).

A meta data restoring method according to an embodiment of the inventive concept will be described below with reference to FIG. 10.

Figure 10:
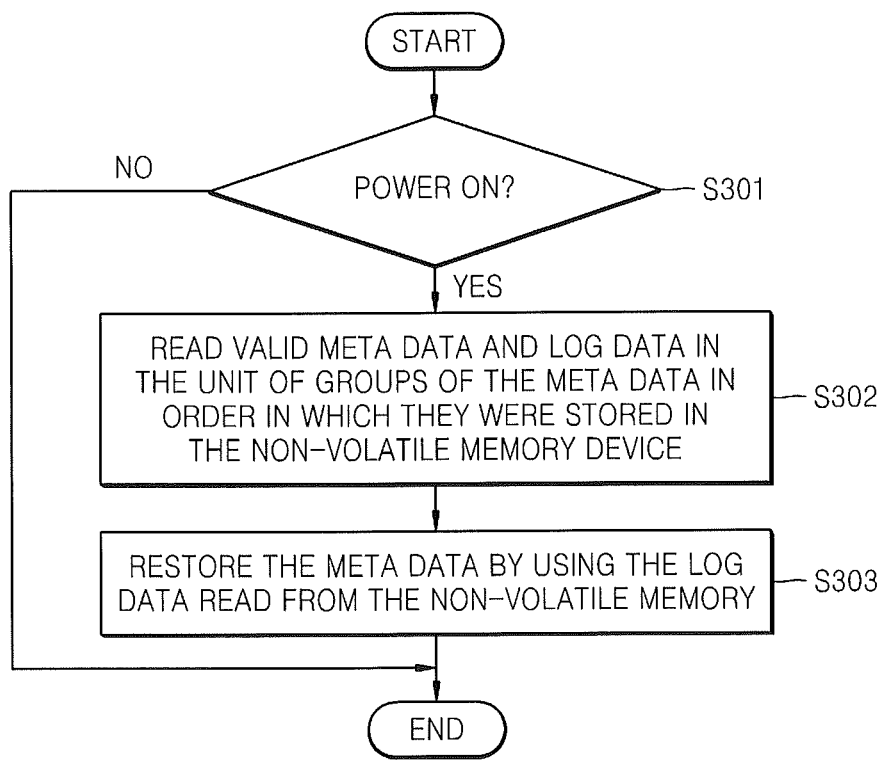
FIG. 10 is a flowchart illustrating a meta data restoring method, according to an embodiment of the inventive concept.

Referring to FIGS. 1 and 10, first, the memory controller 130 determines whether the memory system 100 is powered on (operation S301).

If it is determined in operation 301 that that memory system 100 is powered on, then valid meta data and log data are read in unit of groups of the meta data in the order in which they were stored in the non-volatile memory device 140, e.g., a flash memory (operation S302). If valid log data is not stored in the non-volatile memory device 140, only valid meta data is read in units of groups of the meta data. Information regarding locations where meta data and log data are stored and information regarding the order in which they are stored may be obtained from the root information region 32 of the non-volatile memory device 140.

Next, the memory controller 130 sequentially restores the groups of the meta data by using the read log data (operation S303). For example, valid meta data stored before the read log data is stored may be restored based on the read log data. Reading of the log data and meta data may overlap with the restoring of the meta data by replaying the log data.

Meta data restoring methods according to various embodiments of the inventive concept will be described in greater detail below with reference to FIGS. 11 to 13.

Figure 11:
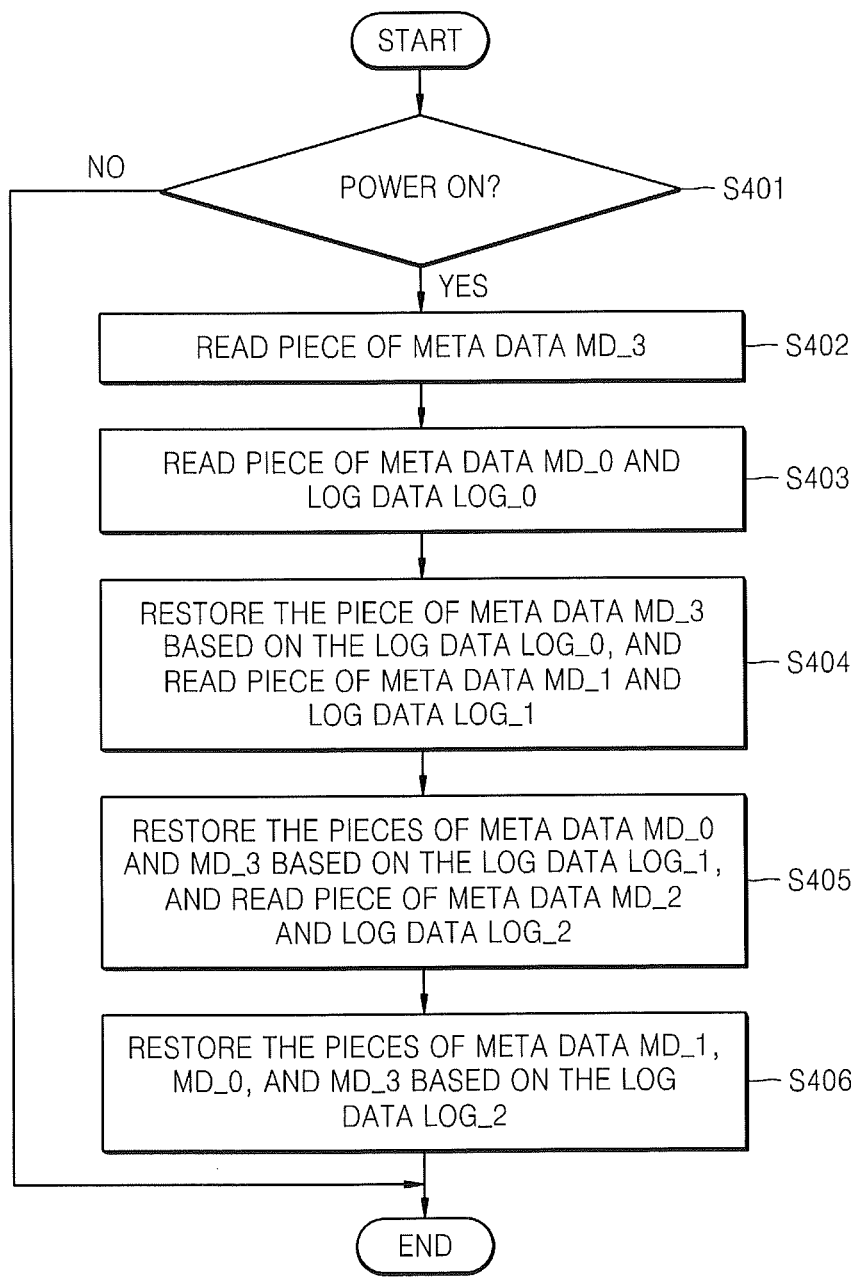
FIG. 11 is a flowchart illustrating a meta data restoring method performed when meta data and log data were stored in a non-volatile memory device of FIG. 1 as illustrated in FIG. 14 and an abnormal power off occurs, according to another embodiment of the inventive concept.

FIG. 11 is a flowchart illustrating a meta data restoring method performed when meta data and log data were stored in the non-volatile memory device 140 of FIG. 1 as illustrated in FIG. 14 and an abnormal power off occurs at a point of time T1, according to another embodiment of the inventive concept. Referring to FIGS. 1, 11, and 14, the memory controller 130 determines whether the memory system 100 is powered on (operation S401).

If the memory system 100 is powered on, the memory controller 130 detects information regarding the location where the meta data and log data were stored and information indicating the order in which the meta data and the log data are stored, from the root information region 32 of the non-volatile memory device 140, e.g., a flash memory, and then reads groups of valid meta data in the order they were stored in the non-volatile memory device 140, based on the detected information.

Referring to FIG. 14, the piece of meta data MD_3 is valid meta data that was first stored in the non-volatile memory device 140.

Thus, the piece of meta data MD_3 is read and stored in the buffer memory 120 (operation S402).

Since the piece of meta data MD_0 and the log data Log_0 were stored in the non-volatile memory device 140 after the piece of meta data MD_3 was stored in the non-volatile memory device 140, the piece of meta data MD_0 and the log data Log_0 are read and stored in the buffer memory 120 (operation S403).

Since the piece of meta data MD_3 was written to the non-volatile memory device 140 before the log data Log_0 was written, the piece of meta data MD_3 stored in the buffer memory 120 is restored based on the log data Log_0, and then, the piece of meta data MD_1 and the log data Log_1 stored in the non-volatile memory device 140 after the piece of meta data MD_0 and the log data Log_0 were stored, are read and stored in the buffer memory 120 (operation S404). The restoring of the piece of meta data MD_3 and the reading of the piece of meta data MD_1 and the log data Log_1 may be simultaneously performed to reduce a time needed to restore all of the groups of the meta data.

Since the pieces of meta data MD_0 and MD_3 were written to the non-volatile memory device 140 before the log data Log_1 was written, the pieces of meta data MD_0 and MD_3 stored in the buffer memory 120 are restored based on the log data Log_1, and then, the piece of meta data MD_2 and the log data Log_2 that were stored in the non-volatile memory device 140 after the piece of meta data MD_1 and the log data Log_1 were stored, are read and stored in the buffer memory 120 (operation S405). The restoring of the pieces of meta data MD_0 and MD_3 and the reading of the piece of meta data MD_2 and the log data Log_2 may be simultaneously performed.

Since the pieces of meta data MD_1, MD_0, and MD_3 were written to the non-volatile memory device 140 before the log data Log_2 was written, the pieces of meta data MD_1, MD_0, and MD_3 stored in the buffer memory 120 are restored based on the log data Log_2 (operation S406). Referring to FIG. 14, since no meta data and log data are stored in the non-volatile memory device 140 after the piece of meta data MD_2 and the log data Log_2 were written, the method ends.

Figure 12:
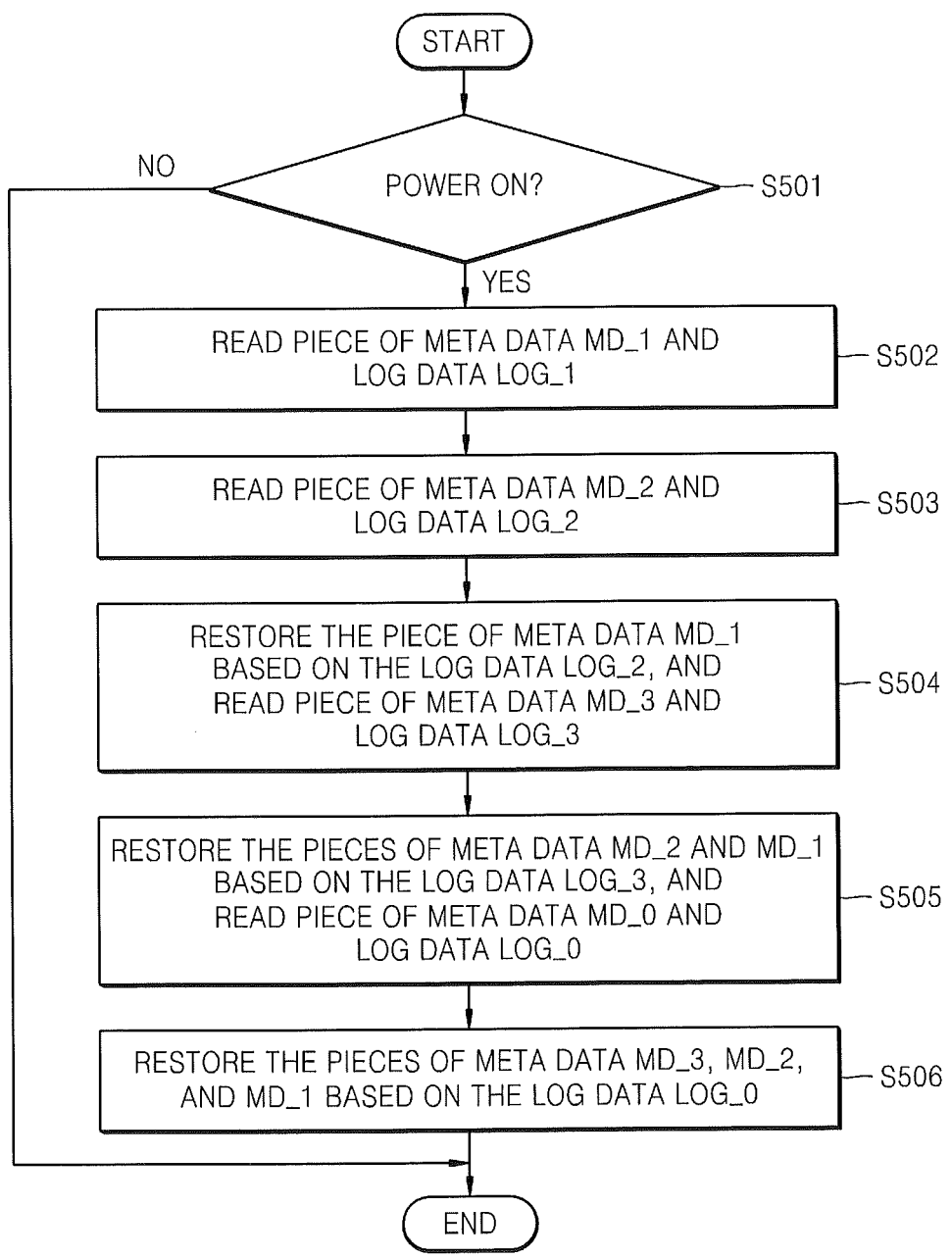
FIG. 12 is a flowchart illustrating a meta data restoring method performed when meta data and log data were stored in the non-volatile memory device of FIG. 1 as illustrated in FIG. 15 and an abnormal power off occurs, according to another embodiment of the inventive concept.

FIG. 12 is a flowchart illustrating a meta data restoring method performed when meta data and log data were stored in the non-volatile memory device 140 of FIG. 1 as illustrated in FIG. 15 and an abnormal power off occurs at a point of time T2, according to another embodiment of the inventive concept. Referring to FIGS. 1, 12 and 15, the memory controller 130 determines whether the memory system 100 is powered on (operation S501).

If the memory system 100 is powered on, the memory controller 130 detects information regarding the location where the meta data and log data were stored and information indicating the order in which the meta data and the log data are stored, from the root information region 32 of the non-volatile memory device 140, e.g., a flash memory, and then reads groups of valid meta data in the order they were stored in the non-volatile memory device 140, based on the detected information.

Referring to FIG. 15, the piece of meta data MD_1 is valid meta data that was first stored in the non-volatile memory device 140.

Thus, the piece of meta data MD_1 is read and stored in the buffer memory 120 (operation S502). When valid data is first stored in the non-volatile memory device 140, log data does not need to be read. Thus, only the piece of meta data MD_1 may be read and stored in the buffer memory 120.

Since the piece of meta data MD_2 and the log data Log_2 were stored in the non-volatile memory device 140 after the piece of meta data MD_1 and the log data Log_1 were stored, the piece of meta data MD_2 and the log data Log_2 are read and stored in the buffer memory 120 (operation S503).

Since the piece of meta data MD_1 was written to the non-volatile memory device 140 before the log data Log_2 was written, the piece of meta data MD_1 stored in the buffer memory 120 is restored based on the log data Log_2, and the piece of meta data MD_3 and the log data Log_3 stored in the non-volatile memory device 140 after the piece of meta data MD_2 and the log data Log_2 were stored are read and stored in the buffer memory 120 (operation S504). The restoring of the piece of meta data MD_1 and the reading of the piece of meta data MD_3 and the log data Log_3 may be simultaneously performed.

Since the pieces of meta data MD_2 and MD_1 were written to the non-volatile memory device 140 before the log data Log_3 was written, the pieces of meta data MD_2 and MD_1 stored in the buffer memory 120 are restored based on the log data Log_3, and then, the piece of meta data MD_0 and the log data Log_0 that were stored in the non-volatile memory device 140 after the piece of meta data MD_3 and the log data Log_3 were stored are read and stored in the buffer memory 120 (operation S505). The restoring of the pieces of meta data MD_2 and MD_1 and the reading of the piece of meta data MD_0 and the log data Log_0 may be simultaneously performed.

Since the pieces of meta data MD_3, MD_2, and MD_1 were written to the non-volatile memory device 140 before the log data Log_0 was written, the pieces of meta data MD_3, MD_2, and MD_1 stored in the buffer memory 120 are restored based on the log data Log_0 (operation S506). Referring to FIG. 15, since no meta data and log data are stored in the non-volatile memory device 140 after the piece of meta data MD_0 and the log data Log_0 were written, the method ends.

Figure 13:
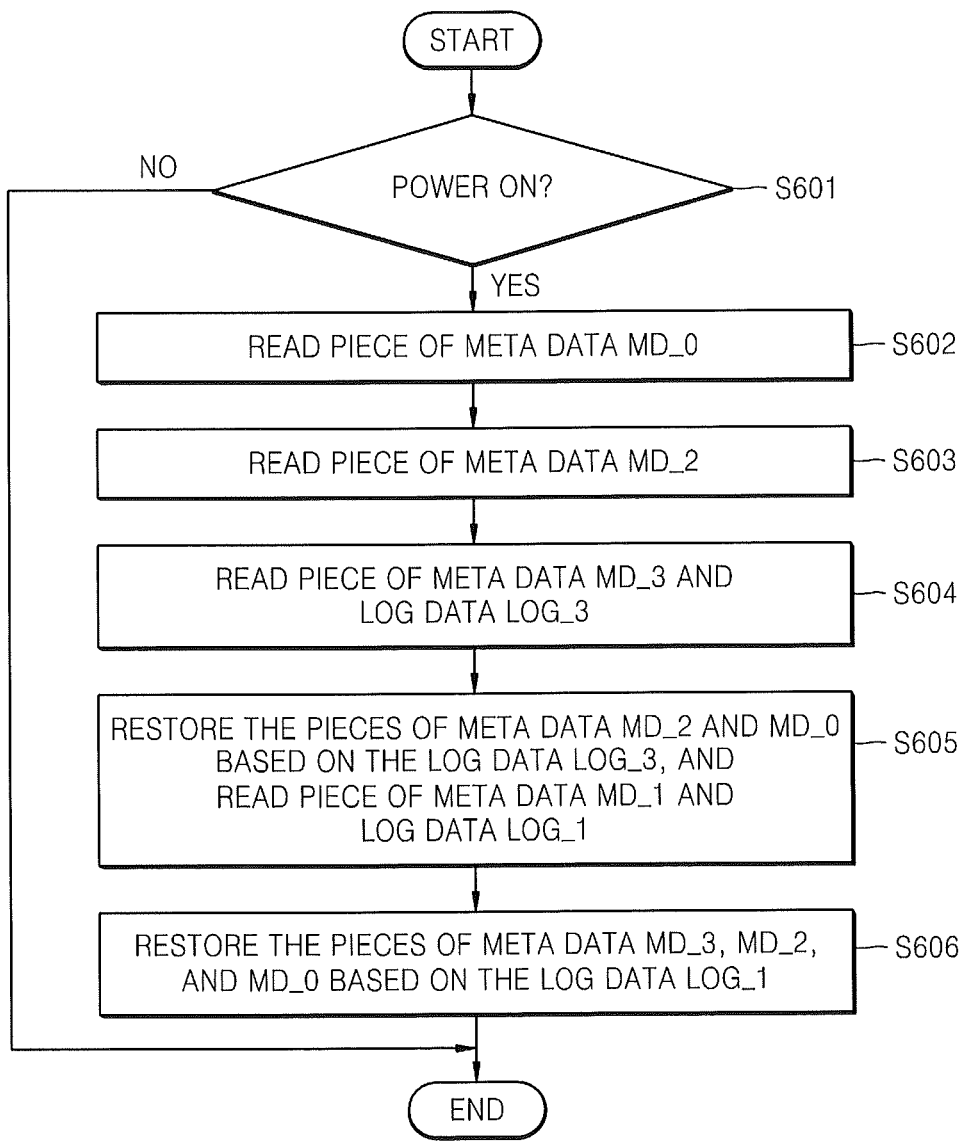
FIG. 13 is a flowchart illustrating a meta data restoring method performed when meta data and log data were stored in the non-volatile memory device of FIG. 1 as illustrated in FIG. 16 and an abnormal power off occurs, according to another embodiment of the inventive concept.

FIG. 13 is a flowchart illustrating a meta data restoring method performed when meta data and log data were stored in the non-volatile memory device 140 of FIG. 1 as illustrated in FIG. 16 and an abnormal power off occurs at a point of time T3, according to another embodiment of the inventive concept. Referring to FIGS. 1, 13, and 16, the memory controller 130 determines whether the memory system 100 is powered on (operation S601).

If the memory system 100 is powered on, the memory controller 130 detects information regarding the location where meta data and log data were stored and information indicating the order in which the meta data and the log data are stored, from the root information region 32 of the non-volatile memory device 140, e.g., a flash memory, and then reads groups of valid meta data in the order they were stored in the non-volatile memory device 140, based on the detected information.

Referring to FIG. 16, the piece of meta data MD_0 is valid meta data that was first stored in the non-volatile memory device 140.

Thus, the piece of meta data MD_0 is read and stored in the buffer memory 120 (operation S602).

Since the piece of valid meta data MD_2 was stored in the non-volatile memory device 140 after the piece of meta data MD_0 was stored, the piece of meta data MD_2 is read and stored in the buffer memory 120 (operation S603).

Since the piece of valid meta data MD_3 and the log data Log_3 were written to the non-volatile memory device 140 after the piece of meta data MD_2 was written, the piece of meta data MD_3 and the log data Log_3 are read and stored in the buffer memory 120 (operation S604).

Since the pieces of meta data MD_2 and MD_0 were written to the non-volatile memory device 140 before the log data Log_3 was written, the pieces of meta data MD_2 and MD_0 stored in the buffer memory 120 are restored based on the log data Log_3, and then, the piece of meta data MD_1 and the log data Log_1 that were stored in the non-volatile memory device 140 after the piece of meta data MD_3 and the log data Log_3 were stored are read and stored in the buffer memory 120 (operation S605). The restoring of the pieces of meta data MD_2 and MD_0 and the reading of the piece of meta data MD_1 and the log data Log_1 may be simultaneously performed.

Since the pieces of meta data MD_3, MD_2, and MD_0 were written to the non-volatile memory device 140 before the log data Log_1 was written, the pieces of meta data MD_3, MD_2, and MD_0 stored in the buffer memory 120 are restored based on the log data Log_1 (operation S506). Referring to FIG. 16, since no meta data and log data are stored in the non-volatile memory device 140 after the piece of meta data MD_1 and the log data Log_1 were written, the method ends.

When an abnormal power off occurs in a memory system, meta data may be restored as described above.

According to an embodiment of the inventive concept, if data and a command for writing a data pattern to a memory system are given from a host device to the memory system and then data transmitted and written to a non-volatile memory device included in the memory system is checked, then meta data is written in specific-sized units to the non-volatile memory device.

In a meta data restoring method according to an embodiment of the inventive concept, meta data divided in a plurality of groups are sequentially read from the non-volatile memory device at predetermined time intervals and are then stored in a buffer memory. The predetermined time intervals vary according to the amount of log data used to restore the meta data but generally increase in the order in which the groups of the meta data are read.

Figure 17:
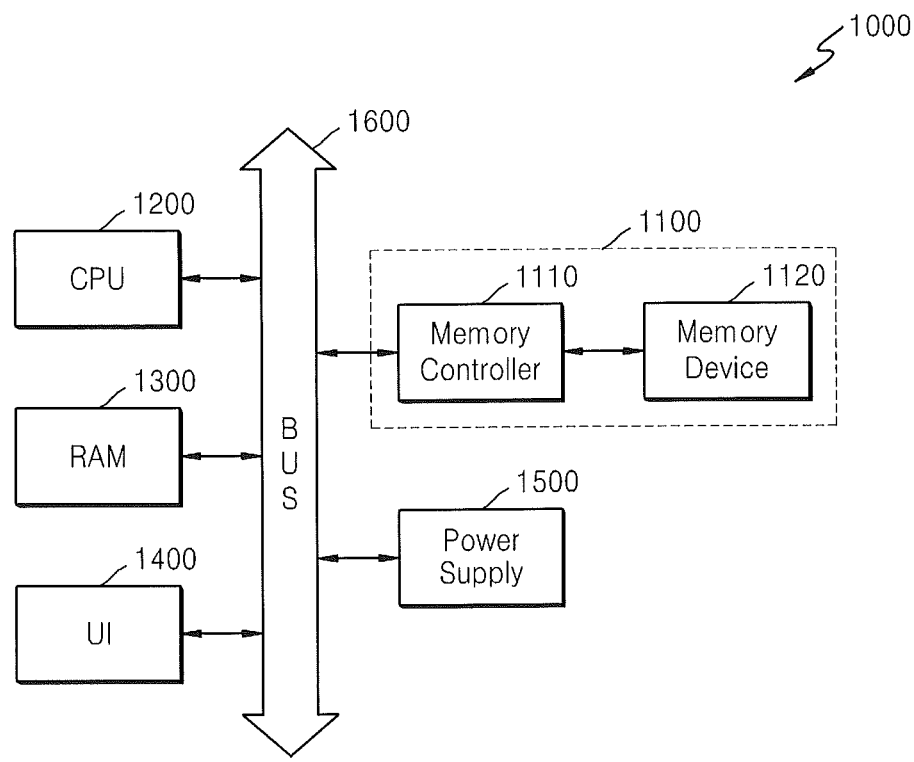
FIG. 17 is a block diagram of a computer system according to an embodiment of the inventive concept.

FIG. 17 is a block diagram of a computer system 1000 according to an embodiment of the inventive concept. The computer system 1000 includes a central processing unit (CPU) 1200, a random access memory (RAM) 1300, a user interface (UI) 1400, and a memory system 1100 that are electrically connected via a bus 1600. The memory system 1100 includes a memory controller 1110 and a memory device 1120. Data, which was processed or is to be processed by the CPU 1200, is stored in the memory device 1120 via the memory controller 1110. The memory system 1100 may be the same as the memory system 100 of FIG. 1 according to an embodiment of the inventive concept. The computer system 1000 may further include a power supply device 1500.

If the memory system 1000 is a mobile device, the power supply device 1500 may be a battery, and a modem, such as a baseband chipset, may be additionally provided. It will be obvious to those of ordinary skill in the art that the computer system 1000 may further include an application chipset, a camera image processor (CIS), mobile dynamic random access memory (DRAM), and the like.

Figure 18:
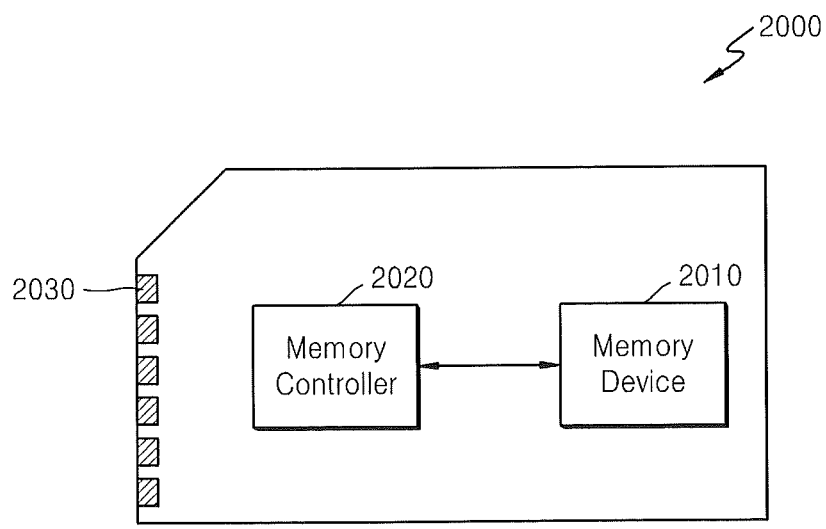
FIG. 18 is a block diagram of a memory card according to an embodiment of the inventive concept.

FIG. 18 is a block diagram of a memory card 2000 according to an embodiment of the inventive concept. Referring to FIG. 18, the memory card 2000 includes a memory controller 2020 and a memory device 2010. The memory controller 2020 controls data to be written to or read from the memory device 2010, in response to a request received from an external host. In order to control the writing and the reading, the memory controller 2020 of the memory card 2000 may further include, for example, an interface unit that acts as an interface with the external host and a RAM that acts as an interface with the memory device 2010. The memory card 2000 may be embodied as the memory system 100 of FIG. 1.

The memory card 2000 may be embodied as a compact flash card (CFC), a Microdrive, a smart media card (SMC), a multimedia card (MMC), a security digital card (SDC), a memory stick, a universal serial bus (USB) flash memory, or the like.

Figure 19:
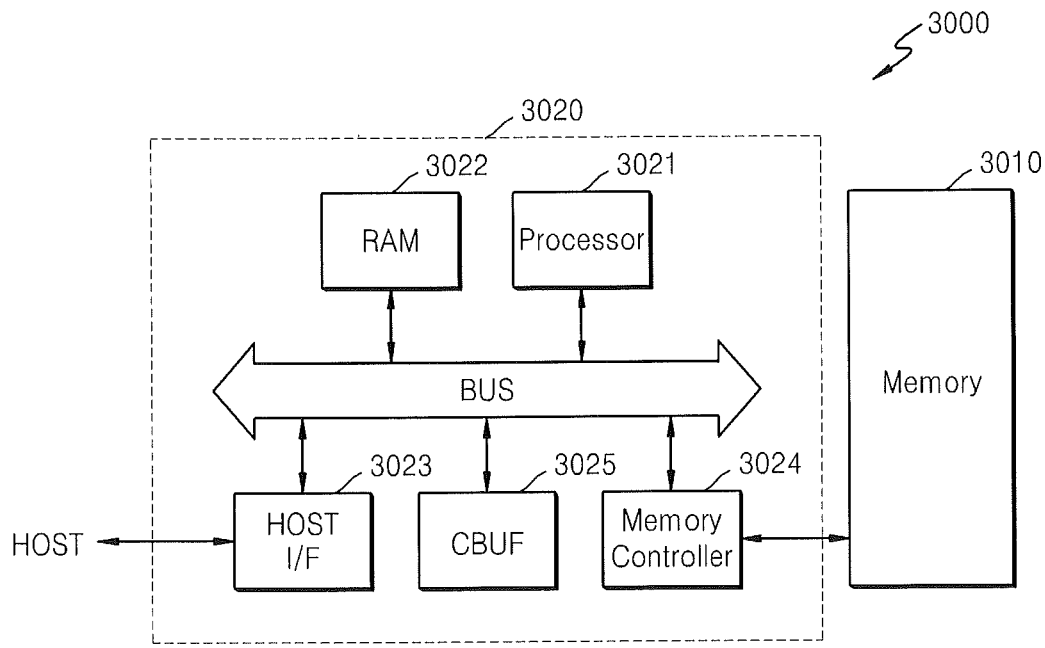
FIG. 19 is a block diagram of a solid state drive (SSD) according to an embodiment of the inventive concept.

FIG. 19 is a block diagram of a solid state drive (SSD) 3000 according to an embodiment of the inventive concept. Referring to FIG. 19, the SSD 3000 includes an SSD controller 3020, and a memory device 3010. The SSD controller 3020 may include a processor 3021, a RAM 3022, a host interface 3023, a memory controller 3024, and a CBUF (cache memory buffer) 3025 that are connected via a bus. The SSD controller 3020 and the memory device 3010 may be embodied as the memory system 100 of FIG. 1.

The processor 3021 controls the memory controller 3024 to exchange data with the memory device 3010, in response to a request, e.g., a command, an address, or data that is given from a host device. The processor 3021 and the memory controller 3024 may be embodied together as one Advanced Risc Machine (ARM) processor. Data needed to perform SSD control may be loaded into the RAM 3022. Data read from or to be written to the memory device 3010 may be temporarily stored in the RAM 3022.

The host interface 3023 receives a request from the host device and transmits the request to the processor 3022, or transmits data received from the memory device 3010 to the host device. The host interface 3023 may interface with the host device by using any of various interface protocols, e.g., a universal serial bus (USB) ARM man machine communication (MMC), peripheral component interconnect-express (PCI-E), serial advanced technology attachment (SATA), parallel advanced technology attachment (PATA), small computer system interface (SCSI), enhanced small device interface (ESDI), and intelligent drive electronics (IDE). Data that is to be transmitted to the memory device 3010 or that is received from the memory device 3010, may be temporarily stored in a cache buffer CBUF. The cache buffer CBUF may be static RAM (SRAM).

Figure 20:
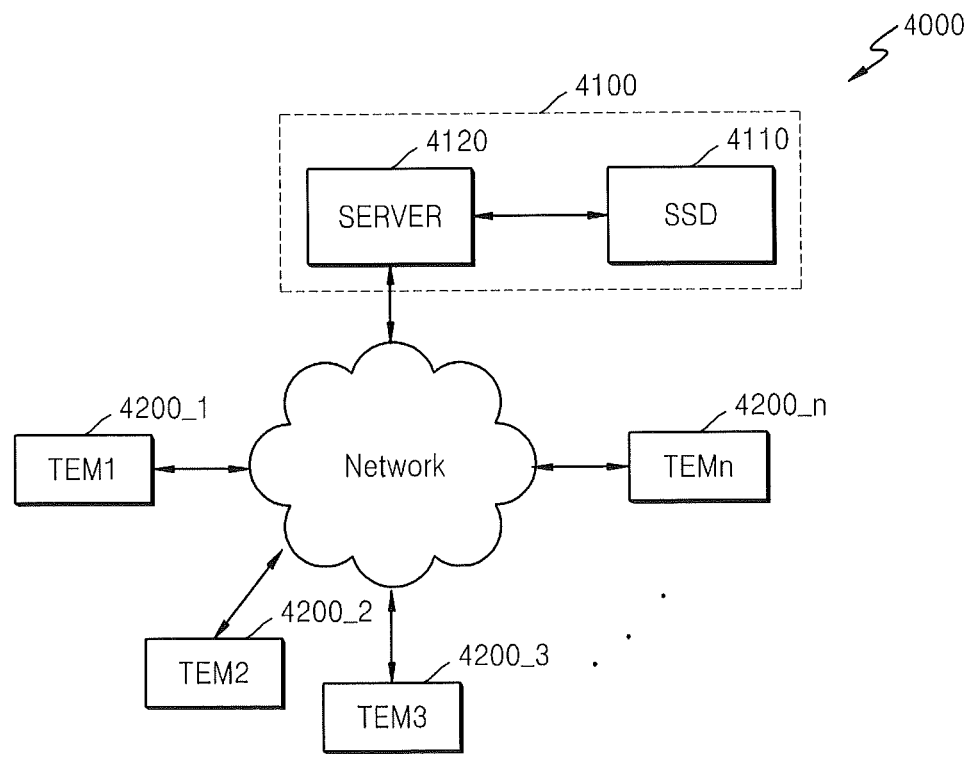
FIG. 20 is a block diagram of a server system with an SSD, and a network system, according to an embodiment of the inventive concept.

FIG. 20 is a block diagram of a server system 4100 with an SSD 4110, and a network system 4000 according to an embodiment of the inventive concept. Referring to FIG. 20, the network system 4000 may further include the server system 4100 and a plurality of terminals 4200_1 to 4200_n that are connected via a network. The server system 4100 may include a server 4120 that processes requests from the plurality of terminals 4200_1 to 4200_n connected via the network, and the SSD 4110 that stores data corresponding to the requests. In this case, the SSD 4110 may be the same as the SSD 3000 of FIG. 19. That is, the SSD 4110 may be embodied as the SSD controller 3020 and the memory device 3010.

A flash memory system according to the above one or more embodiments may be mounted by using any of various types of packages, e.g., package on package (PoP), ball grid arrays (BGAs), chip scale packages (CSPs), plastic leaded chip carrier (PLCC), plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline IC (SOIC), a shrink small outline package (SSOP), a thin small outline (TSOP), a thin quad flatpack (TQFP), a system in package (SIP), a multi chip package (MCP), wafer-level fabricated package (WFP), and a wafer-level processed stack package (WSP).

While the inventive concept has been particularly shown and described with reference to exemplary embodiments thereof, it will be understood that various changes in form and details may be made therein without departing from the spirit and scope of the following claims.

What is claimed is:

1. A method of managing meta data comprising:
reading meta data of an initially set size that is divided into a plurality of groups from a non-volatile memory device and storing the read meta data in a buffer memory;
generating log entry information comprising log data when the meta data changes;
selecting a group of the meta data from among the plurality of groups of the meta data that are stored in the buffer memory when a number of pieces of the generated log entry information is equal to or greater than an initially set threshold value;
storing the selected group of the meta data and the log data in the non-volatile memory device; and
deleting the log entry information comprising the log data from the buffer memory after the log data is stored in the non-volatile memory device,
wherein the log entry information comprises information necessary for restoring the changed meta data,
wherein the selecting of the group of the meta data comprises sequentially selecting a group of the meta data from among the plurality of groups of the meta data that are stored in the buffer memory according to a round-robin scheme irrespective of whether the plurality of groups of the meta data is updated.

2. The method of claim 1, wherein the selected group of the meta data and the log data are stored together in one page of the non-volatile memory device.

3. The method of claim 1, wherein the selected group of the meta data and the log data are stored in different pages of the non-volatile memory device.

4. The method of claim 1, further comprising storing information indicating an order in which the selected group of the meta data and the log data are stored in the non-volatile memory device.

5. The method of claim 1, wherein, if the number of pieces of the log entry information is equal to or greater than the initially set threshold value, groups of the meta data that are updated from among the plurality of groups of the meta data are sequentially selected according to a round-robin scheme.

6. The method of claim 1, further comprising: restoring the meta data using the log data stored in the non-volatile memory device.

7. The method of claim 6, wherein the restoring of the meta data is performed after the memory system is powered on directly after an abnormal power off of the memory system.

8. The method of claim 6, wherein restoring the meta data comprises:

reading the log data and the plurality of groups of the meta data in an order in which the log data and the plurality of groups of the meta data are stored in the non-volatile memory device; and restoring groups of the meta data that have been stored before the log data is stored, by replaying the read log data.

9. The method of claim 6, wherein the restoring of the meta data comprises: simultaneously performing restoring of groups of the meta data stored prior to first log data stored at a first point of time by replaying the first log data and performing reading of second log data stored at a second point of time later than the first point of time and the groups of the meta data.

10. The method of claim 1, wherein the log entry information comprises type information representing a type of an operation causing the change in the meta data, and data for restoring the change in the meta data.

11. The method of claim 10, wherein the type information representing the type of the operation causing the change in the meta data comprises information defining a type of at least a write operation, block allocation, or copying pages.

12. The method of claim 10, wherein the data for restoring the change in the meta data comprises information regarding a logical address, a previous physical address, and a new physical address.

13. The method of claim 1, wherein after the selected group of the meta data is stored in the non-volatile memory device, a group of meta data that has been previously stored in the non-volatile memory device and is the same as the selected group of the meta data is invalidated.

14. A memory system comprising:
a non-volatile memory device for storing data and meta data of an initially set size that is divided into a plurality of groups;
a buffer memory for temporarily storing the meta data divided into the plurality of groups, and log entry information that constitutes log data; and
a memory controller for updating the meta data stored in the buffer memory when an operation causing a change in the meta data is performed, generating log entry information and storing the log entry information in the buffer memory, and storing a group of the meta data from among the plurality of groups of the meta data that are stored in the buffer memory when a number of pieces of the generated log entry information stored in the buffer memory is equal to or greater than an initially set threshold value and the log data in the non-volatile memory device,
wherein the memory controller sequentially selects a group of the meta data from among the plurality of groups of the meta data that are stored in the buffer memory according to a round-robin scheme irrespective of whether the plurality of groups of the meta data is updated when the number of pieces of the generated log entry information stored in the buffer memory is equal to or greater than the initially set threshold value and stores the selected group of the meta data and the log data together in the non-volatile memory device.

15. The memory system of claim 14, wherein, after the memory system is powered on directly after an abnormal power off of the memory system the memory controller reads the log data and the plurality of groups of the meta data in an order in which the log data and the plurality of groups of the meta data are stored in the non-volatile memory device, and restores groups of the meta data by replaying the read log data.

16. The memory system of claim 14, wherein, if the number of pieces of the log entry information is equal to or greater than the initially set threshold value, the memory controller sequentially selects groups of the meta data that are updated from among the plurality of groups of the meta data according to a round-robin scheme and stores the selected groups of the meta data and the log data together in the non-volatile memory device.

17. The memory system of claim 14, wherein the memory controller generates the log entry information comprising type information representing a type of an operation causing the change in the meta data when the meta data changes and data for restoring the change in the meta data and stores the log entry information in the buffer memory.

18. The memory system of claim 14, wherein the memory controller deletes the log entry information that constitutes the log data from the buffer memory after storing the log data in the non-volatile memory device.

19. The memory system of claim 14, wherein the memory controller invalidates a group of meta data that has been previously stored in the non-volatile memory device and is the same as the selected group of the meta data after storing the selected group of the meta data in the non-volatile memory device.

20. The memory system of claim 14, wherein, if the number of pieces of the log entry information is equal to or greater than the initially set threshold value, the memory controller performs storing of the selected group of the meta data at a first location of the non-volatile memory device and storing of the log data at a second location of the non-volatile memory device, and
wherein the meta data comprises mapping information for translating a logical address to a physical address of the non-volatile memory device.

* * * * *